United States Patent
Baughman et al.

(10) Patent No.: US 9,830,312 B2
(45) Date of Patent: *Nov. 28, 2017

(54) MOBILE BASED LEXICON AND FORECASTING

(71) Applicant: INTERNATIONAL BUSINESS MACHINES CORPORATION, Armonk, NY (US)

(72) Inventors: Aaron K. Baughman, Silver Spring, MD (US); Blaine H. Dolph, Western Springs, IL (US); Kamran R. Khan, Lombard, IL (US); Carlos A. Paez, Jr., Chicago, IL (US); Palani Sakthi, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,874

(22) Filed: Jan. 3, 2017

(65) Prior Publication Data

US 2017/0109342 A1 Apr. 20, 2017

Related U.S. Application Data

(63) Continuation of application No. 15/218,162, filed on Jul. 25, 2016, now Pat. No. 9,569,423, which is a (Continued)

(51) Int. Cl.
*G06F 17/27* (2006.01)
*G06F 17/30* (2006.01)

(52) U.S. Cl.
CPC ........ *G06F 17/277* (2013.01); *G06F 17/2785* (2013.01); *G06F 17/30654* (2013.01); *G06F 17/30684* (2013.01)

(58) Field of Classification Search
CPC ............................ G06F 17/2881; G10L 15/18
(Continued)

(56) References Cited

U.S. PATENT DOCUMENTS 7,376,645 B2 5/2008 Bernard
8,447,607 B2 5/2013 Weider et al.
(Continued)

OTHER PUBLICATIONS

Amendment filed Apr. 29, 2016 in response to Office Action (dated Jan. 29, 2016) for U.S. Appl. No. 14/250,748, filed Apr. 11, 2014; Confirmation No. 7063.
(Continued)

*Primary Examiner* — Jakieda Jackson
(74) *Attorney, Agent, or Firm* — Schmeiser, Olsen & Watts; Michael A. Petrocelli

(57) ABSTRACT

An approach is provided for ranking candidate answers to a natural language question. First contextual information about a user of a mobile device is identified. A prioritization of definitions of terms is determined. Based on the prioritization, a lexicon of the terms is generated. Using mobile-based time series manipulation and pattern recognition and based on historical usage of the mobile device, a location of the user, an environment of the user, and a bodily function of the user, second contextual information is forecasted. Based on a word sense disambiguation of the terms in the lexicon and an adjustment of the prioritization, candidate answers are modified and then ranked. The highest ranked candidate answer is more likely to be a correct answer to the natural language question than the other candidate answers.

16 Claims, 7 Drawing Sheets

Related U.S. Application Data continuation of application No. 14/250,748, filed on Apr. 11, 2014, now Pat. No. 9,430,461.

(58) Field of Classification Search
USPC .............................................................. 704/9
See application file for complete search history.

(56) References Cited

U.S. PATENT DOCUMENTS

| | | | |
|---|---|---|---|
| 8,781,989 | B2 | 7/2014 | Duchon |
| 8,892,446 | B2 | 11/2014 | Cheyer et al. |
| 9,430,461 | B2 | 8/2016 | Baughman et al. |
| 2003/0105638 | A1 | 6/2003 | Taira |
| 2007/0050191 | A1 | 3/2007 | Weider et al. |
| 2011/0034176 | A1 | 2/2011 | Lord et al. |
| 2011/0106617 | A1 | 5/2011 | Cooper et al. |
| 2011/0231353 | A1 | 9/2011 | Wang et al. |
| 2011/0258049 | A1 | 10/2011 | Ramer et al. |
| 2012/0232885 | A1 | 9/2012 | Barbosa et al. |
| 2012/0296638 | A1 | 11/2012 | Patwa |
| 2013/0095805 | A1 | 4/2013 | LeBeau et al. |
| 2013/0132072 | A1 | 5/2013 | Pradhan et al. |
| 2013/0151997 | A1 | 6/2013 | Migoya |
| 2015/0293899 | A1 | 10/2015 | Baughman et al. |
| 2016/0335247 | A1 | 11/2016 | Baughman et al. |

OTHER PUBLICATIONS

Arampatzis, et al.; A Survey of Applications of Wireless Sensors and Wireless Sensor Networks; Proceedings of the 13th Mediterranean Conference on Control and Automation; Jun. 27-29, 2005; 6 pages.

Dietterich, Thomas G.; Ensemble Methods in Machine Learning; Lecture Notes in Computer Science, vol. 1857; Jun. 21-23, 2000; 15 pages.

Jacobs et al.; Adaptive Mixtures of Local Experts; Neural Computations, vol. 3, Issue 1; Spring 1991; pp. 79-87.

Jimeno-Yepes et al.; Knowledge-based biomedical word sense disambiguation: comparison of approaches; BMC Bioinformatics; Nov. 22, 2010; 12 pages.

Notice of Allowance (dated May 24, 2016) for U.S. Appl. No. 14/250,748, filed Apr. 11, 2014; Confirmation No. 7063.

Office Action (dated Jan. 29, 2016) for U.S. Appl. No. 14/250,748, filed Apr. 11, 2014; Confirmation No. 7063.

Porter, et al; MRPII and stand-alone finite schedulers: the relationships; University of Huddersfield Repository; Integrated manufacturing systems, 6(a); Jan. 15, 2009; pp. 22-26; ISSN 0957-6061.

Roy et al.; Connecting Language to the World; Elsevier Science; Jun. 17, 2005; 17 pages.

Tian et al.; Analysis and forecasting of port logistics using TEI@I metnodology; Transportation Planning and Technology; vol. 36, Issue 8; Oct. 30, 2013; pp. 685-702.

Notice of Allowance (dated Sep. 28, 2016) for U.S. Appl. No. 15/218,162, filed Jul. 25, 2016; Confirmation No. 2174.

Normalized Seasonality Partitioning

*A priori define* $\{f(T_i) = y_i, \vec{d}\}$

*Seasonality 0:* Convert all times into Coordinated Universal Time (UTC time)

*Seasonality 1:* Stratify the data into $|\vec{d}|$ sections where $d_1 \ldots d_n$ is based on day time periods.

*Seasonality 2:* Split the day time periods into cycles into sub stratifications, $s(t_i)_d^c$ where $c$ is a cycle and $d$ is the day stratification.

*Seasonality 3:* Remove the last curve or period since the period is current and is not used for training.

*Seasonality 4:* Select the first curve and shift so that $x_0$ is normalized at zero.

*Seasonality 5:* The reference curve, $r(t_i)_0$ becomes the shifted $s(t_i)_0^0$

*Seasonality 6:* For each curve $s(t_i)_d^c$, find the best curve match with $r(t_i)_0$

*Seasonality 6a:* Align the curves along the $x_i$ dimension with $r(t_i)_0$

*Seasonality 6b:* Find the best initial local minimum point match,
$p_m = min(abs|r(t_i)_0, s(t_i)_d^c|)$

*Seasonality 6c:* Perform Powell Optimization to minimize the
$error(f_{interpolate}(t_i)_0, f_{interpolate}(t_i)_{d_n})$ with initial guess $p_m$

*Seasonality 6d:* Return the best curve alignment with $r(t_i)_0$

*Seasonality 7:* Start the forecasting with set of aligned curves $a(t_i)_d^c$

*FIG. 4A*

Partial Forecaster /440

*A priori define* $\{a(t_i)_a^c\}$

*Partial 0:* For each $a(t_i)_a^c$, determine a polynomial spline function using Loess interpolation to yield $pf_1(t_i)_a^c$

*Partial 1:* For each $pf_1(t_i)_a^c$ on all $t_i$'s, create a new data set, $pf_f(t_i)_a^c = \mu_t + \alpha\sigma_{t_i}$, where $\alpha$ determines the number of standard deviations and $\sigma$ is the standard deviation value.

*Partial 2:* Repeat Steps *Partial 0* and *Partial 1* for only weekend and select the best curve match $wdc(t_i)$ by minimizing the squared error.

*Partial 3:* Repeat Steps *Partial 0* and *Partial 1* for only week periods and select the best curve match $wec(t_i)$ by minimizing the squared error.

*Partial 4:* Create a forecaster with $wdc(t_i)$ or $wec(t_i)$, $O(t_i) = \frac{t_i - a(t_i)_{start}}{a(t_i)_{end} - a(t_i)_{start}}$, and error function $E(O(t_i)) = e$ that determines the penalty for not using a part of curve for forecasting.

*Partial 5:* Interpolate a forecast value for either a weekend or weekday

*Partial 6:* Return the $\{f_i, e_i\}$ values for the forecast.

*FIG. 4C*

MOBILE BASED LEXICON AND FORECASTING

This application is a continuation application claiming priority to Ser. No. 15/218,162 filed Jul. 25, 2016, now U.S. Pat. No. 9,569,423 issued Feb. 14, 2017 which is a continuation application claiming priority to Ser. No. 14/250,748 filed Apr. 11, 2014 now U.S. Pat. No. 9,430,461 issued Aug. 30, 2016.

TECHNICAL FIELD

The present invention relates to information retrieval and natural language processing, and more particularly to managing candidate answers in a natural language query and answer system.

BACKGROUND

Natural language processing (NLP) systems are attempting to minimize uncertainty from reasoning through the use of known lexicons, ontologies, and corpora ingestion, but overall system accuracy using these known techniques has limitations. A known probabilistic distributed NLP system delivers answers to questions by parsing a natural language query in input text provided by a user, searching for multiple candidate answers to the query in its data set, and assigning confidence scores to the candidate answers. The probabilistic distributed NLP system can, in a limited way, take into account the context of the user who provided the input text if the context is appended to the query. Appending such context to a query, however, does not provide an ideal user experience because the combination of the query and the appended portion is not in the form of a question that would be posed naturally by a user. A known web search engine being utilized via a user's mobile device can take into account context consisting of the user's geographic location by processing search terms based in part on the user's location, which is provided by a global positioning system (GPS) incorporated into the device.

BRIEF SUMMARY

In first embodiments, the present invention provides a method of ranking candidate answers to a natural language question. The method includes a computer receiving the natural language question from a user of a mobile device. The method further includes the computer generating candidate answers to the received natural language question. The method further includes the computer generating a lexicon based on contextual information of the user determined by the mobile device. The method further includes the computer forecasting contextual information of the user based on usage of the mobile device. The method further includes, based in part on the lexicon and the forecasted contextual information, the computer ranking the candidate answers to the natural language question.

Embodiments of the present invention enhances the accuracy of NLP question answering systems by allowing the knowledge base of the question answering system to include contextual information about a user, where the contextual information is captured by a mobile device.

BRIEF DESCRIPTION OF THE DRAWINGS

FIGS. 4A-4C depict forecasting algorithms that are used in the process of FIG. 2, in accordance with embodiments of the present invention.

DETAILED DESCRIPTION

Overview

Embodiments of the present invention provide a ranking of candidate answers generated by a NLP question answering system in response to receiving a natural language question from a user utilizing a mobile device. The ranking of the candidate answers is based on a mobile-based lexicon and forecasted contextual information about the user. Entries in the mobile-based lexicon are based on contextual information of the user, as determined by the mobile device. The forecasted contextual information is a forecast of future behavior or interest(s) of the user based on current and/or historical usage of the mobile device.

A known NLP question answering system provides an answer to a natural language question by using traditional lexicons, ontologies and corpora ingestion, but the overall system accuracy in terms of precision and recall can be improved, which presents a unique challenge to users of NLP systems who desire minimized uncertainty about the answer provided by the NLP system. Furthermore, a user's mobile device interacting with the NLP question answering system presents a large number of candidate answers, which is a unique challenge to the user's experience with the mobile device based on the device having limited display space and the user having limited time to sift through the large number of candidate answers. At least one of these unique challenges is overcome by one or more embodiments of the present invention.

System for Ranking Candidate Answers to a Natural Language Question

Figure 1:
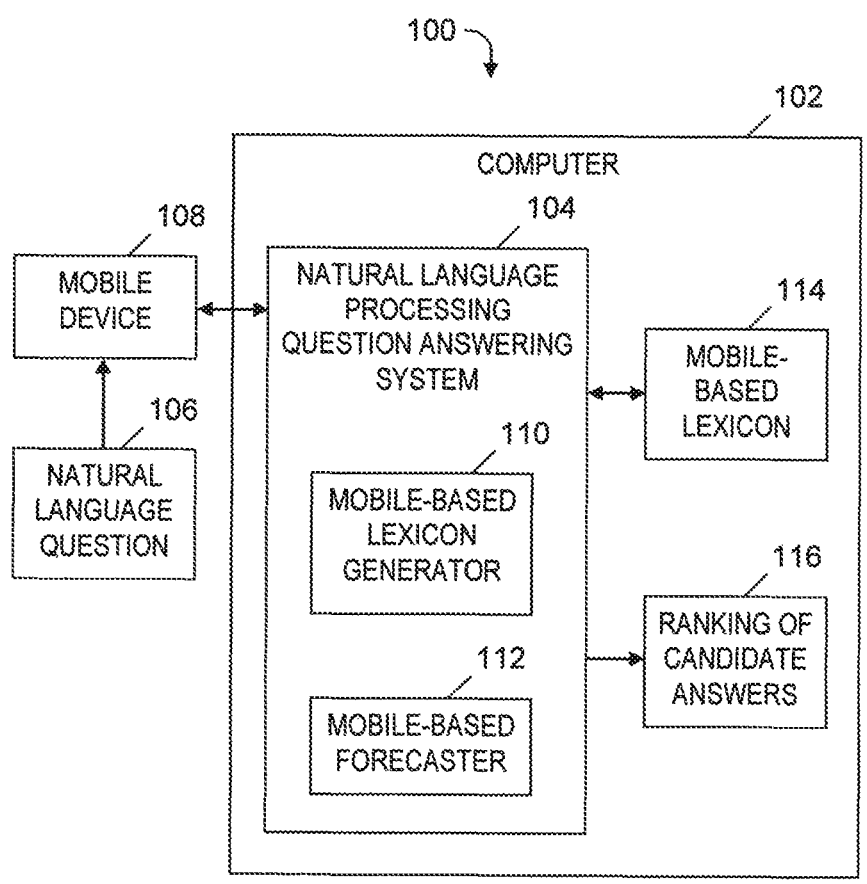
FIG. 1 is a block diagram of a system for ranking candidate answers to a natural language question, in accordance with embodiments of the present invention.

FIG. 1 is a block diagram of a system 100 for ranking candidate answers to a natural language question, in accordance with embodiments of the present invention. System 100 includes a computer 102, which runs a software-based natural language processing (NLP) question answering (QA) system 104. NLP QA system 104 receives a natural language question 106 or other unstructured textual input (not shown) which is entered into a mobile device 108 by a user of the mobile device 108. Natural language question 106 is text in a natural language that includes a question. As used herein, mobile device 108 is a handheld computing device such as a smartphone or a wearable computer, such as smartglasses. In response to receiving a user entry of natural language question 106, mobile device 108 sends natural language question 106 to computer 102 for processing by NLP QA system 104 via a computer network (not shown). Mobile device 108 can use a combination of on-board and off-board mobile processing.

NLP QA system 104 includes the following software modules: a mobile-based lexicon generator 110 and a mobile-based forecaster 112. Mobile-based lexicon generator 110 generates a lexical analyzer (not shown) and a mobile-based lexicon 114. The lexical analyzer (also known as (a.k.a.) lexer or tokenizer) generated by mobile-based lexicon generator 110 is a computer program that transforms a stream of characters into a stream of "atomic chunks of meaning," which are tokens (i.e., meaningful character strings). Mobile-based lexicon generator 110 generates the lexical analyzer based on contextual information about the user of mobile device 108. The generated lexical analyzer transforms a stream of characters based in part on meanings of character strings, where the meanings are based on the contextual information about the user. The mobile-based lexicon 114 is a repository of words and other terms along with their definitions, which are ranked or otherwise prioritized based on contextual information about the user. The prioritization of the words and other terms in mobile-based lexicon 114 can be based on historical usage of mobile device 108, geographic locations of mobile device 108 provided by a GPS system coupled to the mobile device, or other data about movement of the user or surroundings of the user, as detected by sensor(s) coupled to mobile device 108. The historical usage of mobile device 108 can include website(s) visited by the user of mobile device 108 and search terms entered by the user into a search engine accessed by mobile device 108.

Mobile-based forecaster 112 employs forecasting algorithm(s) to generate one or more predictions about what the contextual information of the user of mobile device 108 will be in a specified time in the future. The contextual information includes interests of the user. The prediction(s) generated by mobile-based forecaster 112 can be based on historical usage of mobile device 108, including website(s) visited by the user of mobile device 108, search term(s) entered by the user into a search engine, and geographic position(s) at which mobile device 108 was located as determined by a GPS system coupled to the mobile device.

NLP QA system 104 generates candidate answers to natural language question 106. Based on the contextual information prediction(s) generated by mobile-based forecaster 112 and the prioritization of definitions in mobile-based lexicon 114, NLP QA system 104 generates a ranking 116 of the candidate answers.

Although not shown in FIG. 1, other embodiments include multiple mobile devices 108 that work together to determine and provide the contextual information about the user, where the multiple mobile devices 108 can use a combination of on-board and off-board mobile processing.

As one example, NLP QA system 104 is an enhancement of the Watson® question answering computing system offered by International Business Machines Corporation located in Armonk, N.Y., whereby the enhancement receives the aforementioned contextual information about a user of mobile device 108, incorporates the contextual information into a base of knowledge, and uses the contextual information in the base of knowledge as at least a partial basis for ranking candidate answers to a natural language question. The Watson® question answering system delivers answers to questions by receiving and parsing input text, looking for multiple candidate answers in its data set, and assigning a confidence score to each of the candidate answers. In its current form, without the enhancement described herein, the Watson® question answering system does not take into account the context of the user asking the question. For example, a user entering "What is the best way to treat my condition of X", where X is a medical condition, will receive the same answer from the known Watson® question answering system if the user is located in Country A, Country B, Country C, or Country D when entering the question. The actual answer or best answer, however, may differ based in part on whether the user is currently located in Country A, Country B, Country C, or Country D (i.e., based in part on the context of the user, where the context is the geographic location of the user). In this example, the enhancement provided by the NLP QA system 104 generates a ranking of candidate answers that is based in part on whether the user is currently located in Country A, Country B, Country C, or Country D, where the country in which the user is located is determined from geographic coordinates provided by a GPS (not shown) coupled to mobile device 108.

Figure 2:
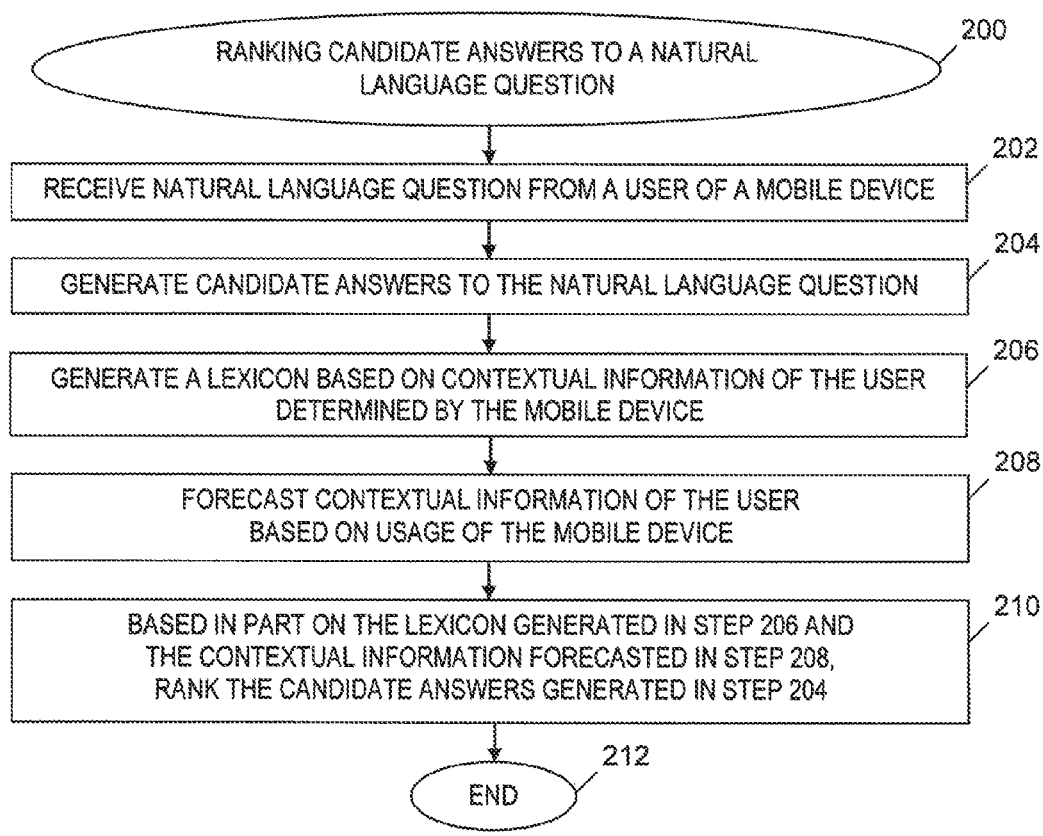
FIG. 2 is a flowchart of a process of ranking candidate answers to a natural language question, where the process is implemented in the system of FIG. 1, in accordance with embodiments of the present invention.
Figure 5:
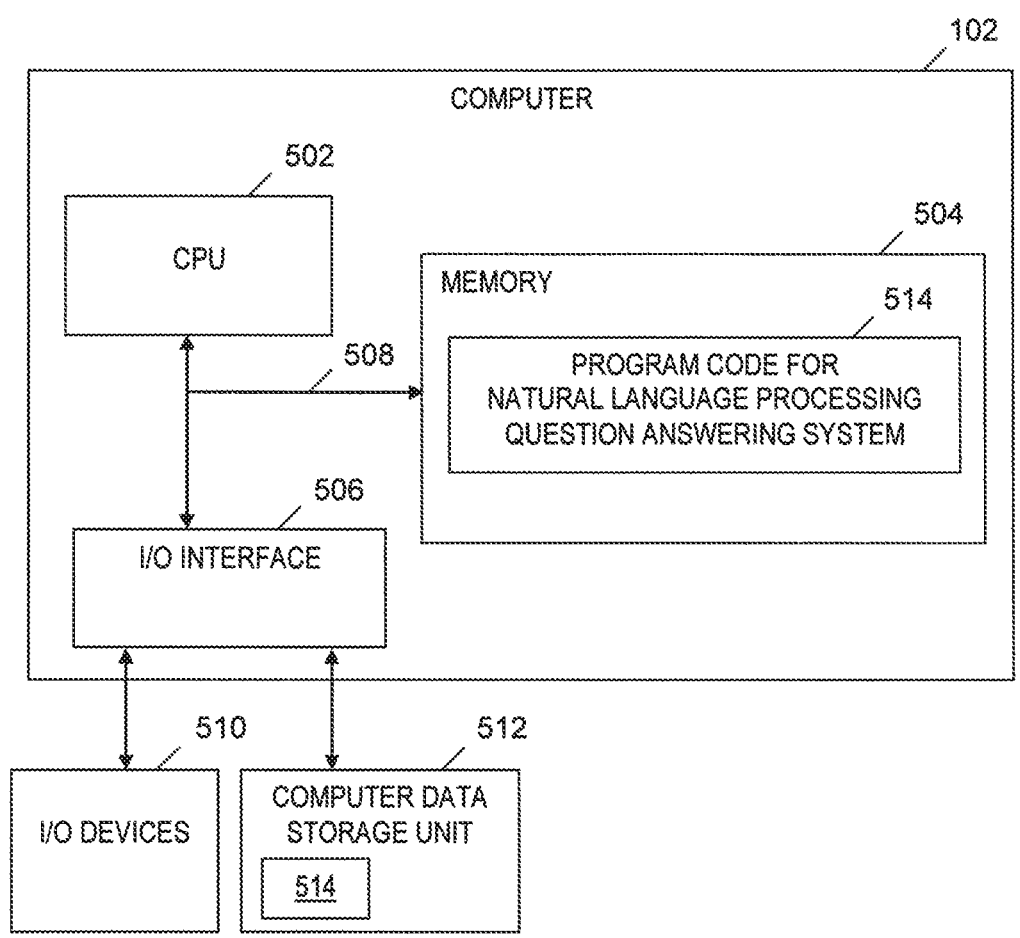
FIG. 5 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2 and FIG. 5 presented below.

Process for Ranking Candidate Answers to a Natural Language Question

FIG. 2 is a flowchart of a process of ranking candidate answers to a natural language question, where the process is implemented in the system of FIG. 1, in accordance with embodiments of the present invention. The process of FIG. 2 begins at step 200. In step 202, NLP QA system 104 (see FIG. 1) receives natural language question 106 (see FIG. 1) as unstructured text from a user of mobile device 108 (see FIG. 1).

In step 204, NLP QA system 104 (see FIG. 1) analyzes natural language question 106 (see FIG. 1), generates candidate answers in response to natural language question 106 (see FIG. 1), gathers evidence in support of the candidate answers, and generates initial scores for the candidate answers based on the gathered evidence. To analyze natural language question 106 (see FIG. 1), NLP QA system 104 (see FIG. 1) generates a lexical analyzer, which transforms streams of characters in natural language question 106 into meaningful character strings. In step 204 and subsequent steps of FIG. 2, NLP QA system 104 (see FIG. 1) dynamically adjusts the criteria for determining which character string is meaningful or not based in part on contextual information about the user (see the discussion below relative to step 206) and based in part on forecasted contextual information about the user (see the discussion below relative to step 208).

In one embodiment, the candidate answers generated in step 204 are potentially correct answers that are replies or responses to natural language question 106 (see FIG. 1). In another embodiment, the candidate answers generated in step 204 are questions that are presented to the user of mobile device 108 (see FIG. 1) to obtain additional contextual information about the user or other additional information (e.g., to assist in a medical diagnosis).

Prior to step 206, NLP QA system 104 (see FIG. 1) identifies contextual information about the user of mobile device 108 (see FIG. 1), where the contextual information has been determined by mobile device 108 (see FIG. 1). The aforementioned contextual information about the user can include interest(s) of the user and is determined by any combination of: (1) a list of applications that the user has run on mobile device 108 (see FIG. 1), (2) the websites visited by the user via a browser provided by mobile device 108 (see FIG. 1), (3) textual information, articles or a summarization of articles displayed on and/or downloaded to mobile device 108 (see FIG. 1) (i.e., textual nugget capture by the mobile device 108 (see FIG. 1)), (4) terms entered by the user into a search engine via mobile device 108 (see FIG. 1), (5) multimedia content and/or other types of content captured via mobile device 108 (see FIG. 1), (6) data specifying characteristic(s) of the environment in proximity to the user as detected and/or measured by sensor(s) coupled to mobile device 108 (see FIG. 1), (7) data specifying function(s) of the body of the user or movement(s) of the user as detected and/or measured by sensor(s) coupled to mobile device 108 (see FIG. 1), (8) a geographic location of the user provided by a GPS (not shown) coupled to mobile device 108 (see FIG. 1), and (9) other information detected by mobile device 108 or other information the user enters into mobile device 108 (see FIG. 1). In another embodiment, the contextual information consists of the information listed in (1)-(9) presented above.

The contextual information listed in (1)-(9) presented above may be limited by respective time periods. For example, the applications that the user has run on mobile device 108 (see FIG. 1) may be the applications run within the last D1 days, while the summarization of articles read by the user on mobile device 108 (see FIG. 1) may be the articles read within the last D2 days, where D1 can be the same as or different from D2.

In step 206, NLP QA system 104 (see FIG. 1) generates mobile-based lexicon 114 (see FIG. 1) as a repository or words and other terms, along with one or more definitions for each word or other term. The generation of mobile-based lexicon 114 (see FIG. 1) includes NLP QA system 104 (see FIG. 1) ranking or otherwise prioritizing definitions corresponding to word(s) or term(s) in lexicon 114 (see FIG. 1) based on the aforementioned contextual information determined by mobile device 108 (see FIG. 1). In subsequent steps of the process of FIG. 2 or in a subsequent performance of the entire process of FIG. 2, NLP QA system 104 (see FIG. 1) can dynamically update the terms in mobile-based lexicon 114 (see FIG. 1) and the ranking of the terms. In one embodiment, mobile-based lexicon 114 (see FIG. 1) is ingested into a natural language processing system included in NLP QA system 104 (see FIG. 1).

Subsequent to step 206, NLP QA system 104 (see FIG. 1) can extend mobile-based lexicon 114 (see FIG. 1) by mobile device acronym symbol definition, mobile computing terminology, gesture-based and user emotion summarization, and augmented reality word definitions and word senses.

In step 208, NLP QA system 104 (see FIG. 1) forecasts what the contextual information about the user of mobile device 108 (see FIG. 1) will be at a specified time in the future. The forecasted contextual information is based on historical usage of mobile device 108 (see FIG. 1), including any combination of (1) applications that the user has run on mobile device 108 (see FIG. 1), (2) websites visited by the user via a browser provided by mobile device 108 (see FIG. 1), (3) textual information, articles or a summarization of articles displayed on or downloaded to mobile device 108 (see FIG. 1), (4) terms entered by the user into a search engine via mobile device 108 (see FIG. 1), and (5) multimedia content and/or other types of content captured via mobile device 108 (see FIG. 1). In one embodiment, the forecasted contextual information and is based in part on historical usage of mobile device 108 (see FIG. 1) and based in part on a combination of: geographic position(s) at which mobile device 108 was located as determined by a GPS coupled to the mobile device 108 (see FIG. 1), data specifying characteristic(s) of the environment in proximity to the user as detected and/or measured by sensor(s) coupled to mobile device 108 (see FIG. 1), and data specifying function(s) of the body of the user or movement(s) of the user as detected and/or measured by sensor(s) coupled to mobile device 108 (see FIG. 1).

Figure 4B:
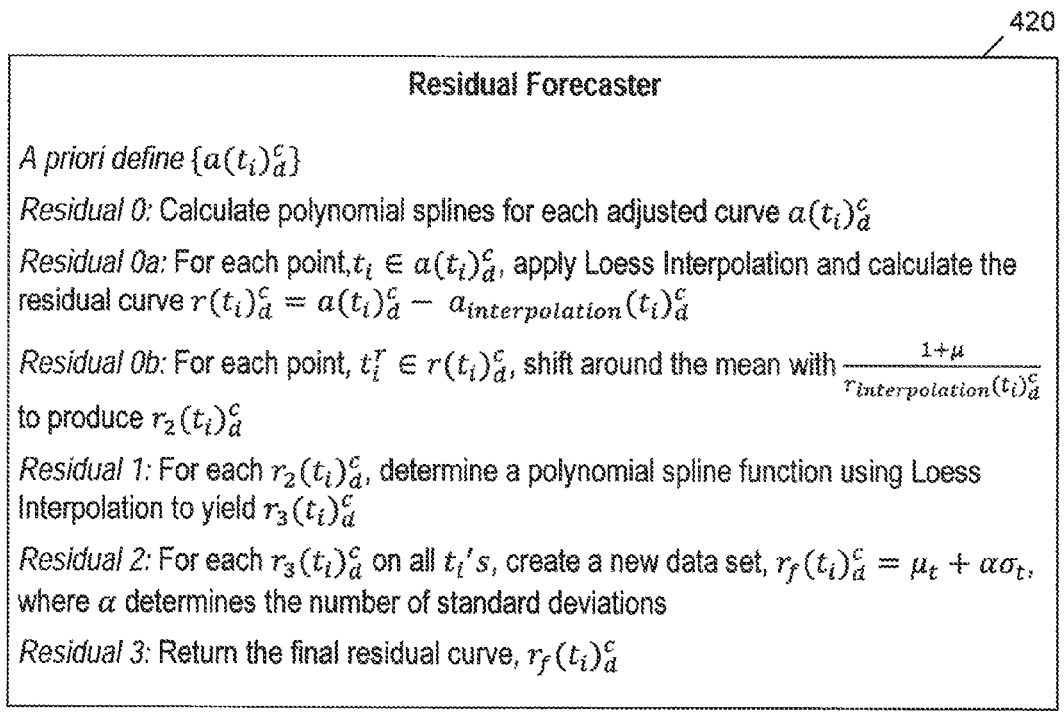

The forecasting performed in step 208 may use any of the forecasting algorithms shown in FIGS. 4A-4C, or a forecasting algorithm (i.e., forecaster) that includes mobile-based time series manipulation and pattern recognition, autoregressive integrated moving average (ARIMA) based modeling based on the aforementioned contextual information of the user as determined by mobile device 108 (see FIG. 1), lag-based modeling based on the contextual information of the user as determined by mobile device 108 (see FIG. 1), residual calculations based on the contextual information of the user as determined by mobile device 108 (see FIG. 1), or probability density based functions such as logistic regression based on mobile-based event detection. In one embodiment, the forecasting in step 208 includes querying the user of mobile device 108 (see FIG. 1), whose response provides additional information to the aforementioned forecasting algorithm so that inferences generated by the forecasting algorithm about the contextual information are increased, as compared to inferences generated by the forecasting algorithm operating without the additional information.

In one embodiment, a mobile context dependent analytical pipeline (not shown) annotates the contextual information forecasted in step 208. The annotated information creates machine learning features based on the text in natural language question 106 (see FIG. 1), the candidate answers generated or modified in the process of FIG. 2, and the context in which each candidate answer appeared, such as passages or evidences.

In one embodiment, a mobile forecaster pipeline (not shown) annotates the contextual information forecasted in step 208, thereby creating machine learning features based on the text of natural language question 106 and the candidate answers generated or modified in the process of FIG. 2, without regard to the context in which the candidate answer appeared.

In step 210, based in part on the prioritization of definitions of word(s) and/or other term(s) in mobile-based lexicon 114 (see FIG. 1) generated in step 206 and the contextual information about the user forecasted in step 208, NLP QA system 104 (see FIG. 1) ranks the candidate answers generated in step 204. The candidate answers ranked from the lowest ranked candidate answer to the highest ranked candidate answer provides candidate answers ordered by how likely each answer is a correct answer to natural language question 106 (see FIG. 1) (i.e., ordered from the candidate answer that is least likely to be the correct answer to natural language question 106 (see FIG. 1) to the candidate answer that is most likely to be the correct answer to natural language question 106 (see FIG. 1)). After step 210, NLP QA system 104 (see FIG. 1) initiates a display on mobile device 108 (see FIG. 1) of the highest ranked candidate answer as the final answer to natural language question 106 (see FIG. 1). The process of FIG. 2 ends at step 212.

In one embodiment, NLP QA system 104 (see FIG. 1) uses the contextual information forecasted in step 208 to perform word sense disambiguation and adjust rankings of terms in mobile-based lexicon 112 (see FIG. 1). Prior to step 210, NLP QA system 104 (see FIG. 1) uses the results of the disambiguation and adjusted rankings to add to, delete from, or modify the candidate answers generated in step 204.

In one embodiment, a machine learning ensemble performs the steps of FIG. 2 and uses the contextual information forecasted in step 208 to alter or adjust machine learning ensemble weights. The machine learning ensemble can include, for example, (1) logistic regression phases and routes, (2) dimensions of evidence refinement, (3) probability density functions, classification techniques, and regression techniques, (4) natural language processing systems, and (5) any data retrieval system.

EXAMPLE

Figure 3:
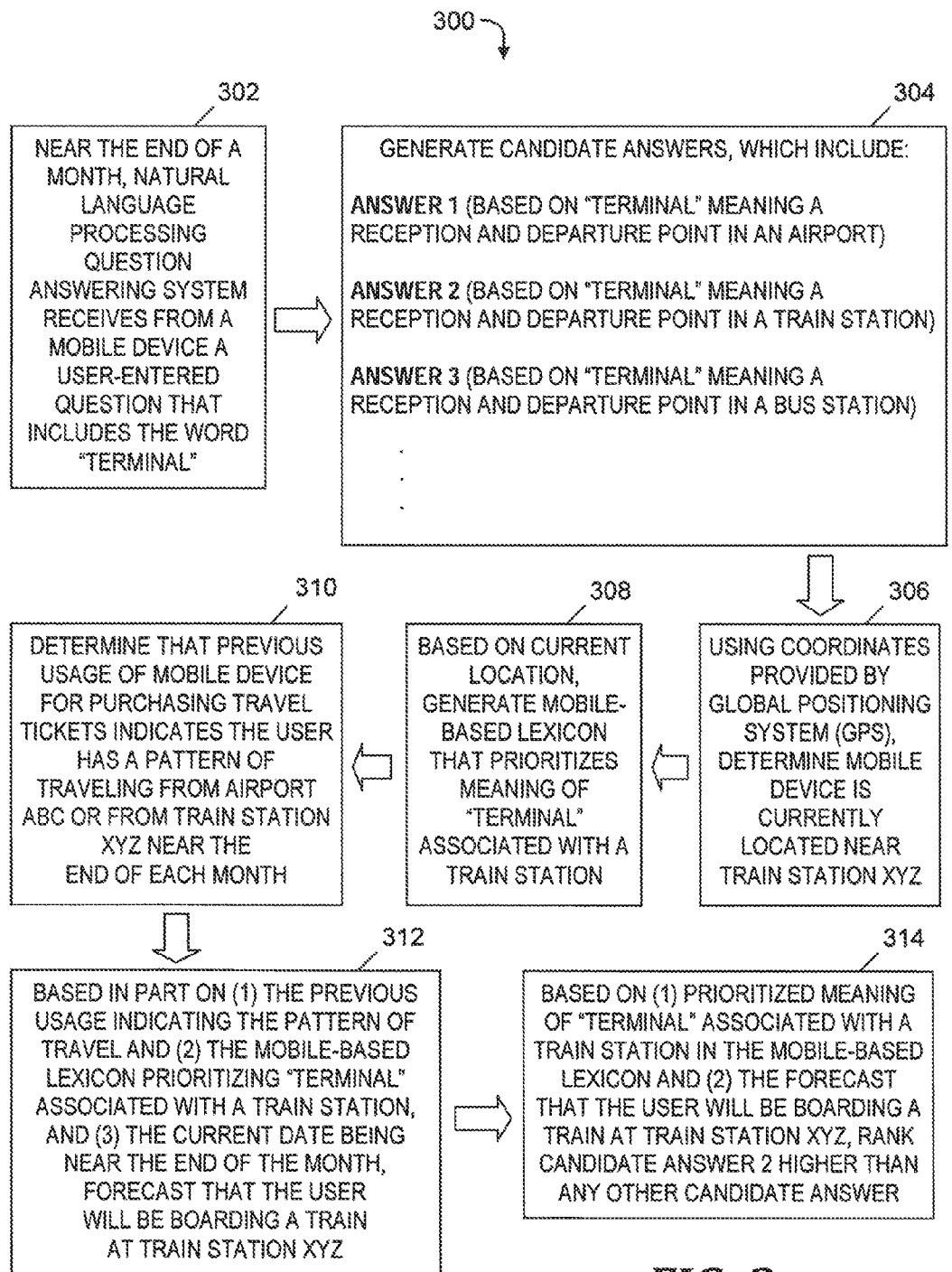
FIG. 3 depicts an example of ranking a candidate answer by steps included in the process of FIG. 2, in accordance with embodiments of the present invention.

FIG. 3 depicts an example 300 of ranking a candidate answer by steps included in the process of FIG. 2, in accordance with embodiments of the present invention. In step 302, near the end of a month, NLP QA system 104 (see FIG. 1) receives from mobile device 108 (see FIG. 1) a question entered by a user of mobile device 108 (see FIG. 1), where the question includes the word "terminal." Step 302 is an example of an action included in step 202 (see FIG. 2).

In step 304, NLP QA system 104 (see FIG. 1) generates multiple candidate answers to the question received in step 302, including first, second and third candidate answers (i.e., Answer 1, Answer 2, and Answer 3, respectively, as shown in FIG. 3). The first candidate answer is based on "terminal" in the question meaning a reception and departure point in an airport. The second candidate answer is based on "terminal" in the question meaning a reception and departure point in a train station. The third candidate answer is based on "terminal" in the question meaning a reception and departure point in a bus station. Although not shown in FIG. 3, the candidate answers may include another answers that are based on "terminal" meaning (1) a mechanical device by means of which an electric connection to an apparatus is established, (2) a point at which current enters or leaves an electrical device, and (3) an electronic or electromechanical device for entering data into a computer or communications system and displaying data received. Step 304 is an example of an action included in step 204 (see FIG. 2).

In step 306, using coordinates provided by a GPS coupled to mobile device 108 (see FIG. 1), NLP QA system 104 (see FIG. 1) determines the current geographic location of mobile device 108 (see FIG. 1) and determines that mobile device 108 (see FIG. 1) is currently located near train station XYZ. Step 306 is an example of an action taken prior to step 206 (see FIG. 2).

In step 308, based on the current location of mobile device 108 (see FIG. 1) determined in step 306, NLP QA system 104 (see FIG. 1) generates mobile-based lexicon 114 (see FIG. 1) so that the definitions of the word "terminal" are ranked or otherwise prioritized with the definition indicating "terminal" means a reception and departure point in a train station receiving the highest rank or priority. Step 308 is an example of an action included in step 206 (see FIG. 2).

In step 310, NLP QA system 104 (see FIG. 1) determines previous usage of mobile device 108 (see FIG. 1) by which travel tickets were purchased by the user of mobile device 108 (see FIG. 1), which indicate the user has established a pattern of traveling from either airport ABC or train station XYZ near the end of each month for the last n months, where n is a predetermined number of months.

In a step that not shown in FIG. 3, but is prior to step 312, NLP QA system 104 (see FIG. 1) determines the current date.

In step 312, based in part on (1) the previous usage of mobile device 108 (see FIG. 1) indicating the user's pattern of traveling from either airport ABC or train station XYZ near the end of each month, (2) the mobile-based lexicon 114 (see FIG. 1), which prioritizes the definition of "terminal" associated with a train station, and (3) the current date being near the end of the current month, NLP QA system 104 (see FIG. 1) forecasts that the user will be boarding a train at train station XYZ. Step 312 is an example of an action included in step 208 (see FIG. 2).

In step 314, based on (1) the definition of "terminal" associated with a train station being prioritized in step 308 over all other definitions of "terminal" in mobile-based lexicon 114 (see FIG. 1), and (2) the forecast made in step 312 that the user will be boarding a train at train station XYZ, NLP QA system 104 (see FIG. 1) ranks Answer 2 higher than any other candidate answer generated in step 304 because Answer 2 is based on "terminal" meaning a reception and departure point in a train station. Step 314 is an example of an action included in step 210 (see FIG. 2).

FIGS. 4A-4C depict forecasting algorithms that are used in the process of FIG. 2, in accordance with embodiments of the present invention. In one embodiment, step 208 in FIG. 2 includes mobile-based forecaster 112 (see FIG. 1) employing a normalized seasonality partitioning algorithm 400 in FIG. 4A. Normalized seasonality partitioning algorithm 400 includes partitioning a time period f into seasonality components or multiple curves using both days and a Powell Optimization process. Normalized seasonality partitioning algorithm 400 includes steps of a process of time series stratification and normalization into $a(t_i)_d^c$ aligned curves that are used forecast the contextual information about the user of mobile device 108 (see FIG. 1).

In another embodiment, step 208 in FIG. 2 includes mobile-based forecaster 112 (see FIG. 1) employing a residual forecaster algorithm 420 in FIG. 4B. Residual forecaster algorithm 420 includes matching amplitudes of historical demand events to future events over a twenty-four hour period. The residual curve generated by residual forecaster algorithm 420 is the maximum curve determined by the differences between actual hit value and the interpolated value.

In yet another embodiment, step 208 in FIG. 2 includes mobile-based forecaster 112 (see FIG. 1) employing a Historical Forecaster ensemble that uses historical information and the current time of day to develop a regression line. The Historical Forecaster ensemble is comprised of five forecasters: Partial Forecaster, Adjusted Average Forecaster, Past Forecaster, Vector Forecaster and Quadratic Expansion Forecaster.

The Partial Forecaster included in the historical forecaster employs a partial forecaster algorithm 440 in FIG. 4C. Partial forecaster algorithm 440 includes forecasting several hours into the future only if the current time is at night with an average curve plus one standard deviation. Half of the data is regressed from the past while the other data is within the future. If the current time to predict is within a weekend, only the weekend partial forecaster is applied; otherwise, the entire partial forecaster is implemented. The error of the forecaster is D(b)=v or a predefined constant equal across all forecasts.

The Adjusted Average Forecaster is identical to the partial forecaster with the exception of its error function and it being applied only during the morning times. The error function of the Adjusted Average Forecaster is equation (1) presented below, which accounts for whether the current is before or after the curve.

$$E(O(t_i)) = \begin{cases} O(t_i) > 1:1 \\ O(t_i) < 1:0 \\ O(t_i)^2 \end{cases} \quad (1)$$

The Past Forecaster retrieves the previous 24-hour forecast curve. The error function for the Past Forecaster is defined as $E(O(t_r))=0$ since the forecast retrieves actual past forecasts that have been corrected.

The Vector Forecaster has the error function $E(b)=((t_{current}-t_{start})/(t_{end}-t_{current}))$.

The Quadratic Expansion Forecaster is uses quadratic curve regression that regresses two hours into the past and projects the curve two hours into the future. The error function for the Quadratic Expansion Forecaster is $E(b)=((t_{current}-t_{start})/(t_{end}-t_{current}))$.

Computer System

FIG. 5 is a block diagram of a computer that is included in the system of FIG. 1 and that implements the process of FIG. 2, in accordance with embodiments of the present invention.

Computer 102 is a computer system that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including carrying out instructions included in program code 514 to perform a method of ranking candidate answers to a natural language question, where the instructions are carried out by CPU 502 via memory 504. CPU 502 may include a single processing unit, or be distributed across one or more processing units in one or more locations (e.g., on a client and server). Program code 514 includes program code for mobile-based lexicon generator 110 (see FIG. 1) and mobile-based forecaster 112 (see FIG. 1).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are carried out. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are carried out by CPU 502 via memory 504 to rank candidate answers to a natural language question. Although FIG. 5 depicts memory 504 as including program code 514, the present invention contemplates embodiments in which memory 504 does not include all of code 514 simultaneously, but instead at one time includes only a portion of code 514.

Further, memory 504 includes an operating system (not shown) and may include other systems not shown in FIG. 5. The operating system may be a Linux®-based operating system that runs on CPU 502 and provides control of various components within and/or connected to computer 102. Linux is a registered trademark of Linus Torvalds in the United States, other countries, or both.

Storage unit 512 and/or one or more other computer data storage units (not shown) that are coupled to computer 102 may store the content of mobile-based lexicon 114 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to ranking candidate answers to a natural language question. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to rank candidate answers to a natural language question. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of ranking candidate answers to a natural language question.

While it is understood that program code 514 for ranking candidate answers to a natural language question may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of ranking candidate answers to a natural language question. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of ranking candidate answers to a natural language question, the method comprising the steps of:
a computer identifying first contextual information about a user of a mobile device, the first contextual information including (1) interests of the user based on historical usage of the mobile device by the user to run applications on the mobile device, visit websites via a browser provided by the mobile device, display textual articles on the mobile devices, enter terms into a search engine via the mobile device, and capture multimedia content, (2) a geographic location of the user provided by a global positioning system (GPS) coupled to the mobile device, (3) data specifying characteristics of an environment in proximity to the user, the characteristics of the environment being detected and measured by a first sensor coupled to the mobile device, and (4) data specifying a bodily function of the user, the bodily function being detected and measured by a second sensor coupled to the mobile device;
based on the first contextual information, the computer determining a prioritization of definitions of terms;
based on the first contextual information and the prioritization of the definitions of the terms, the computer generating a lexicon of the terms;
using a forecaster that employs mobile-based time series manipulation and pattern recognition and based on (1) the historical usage of the mobile device by the user to run the applications on the mobile device, visit the websites via the browser provided by the mobile device, display the textual articles on the mobile devices, enter the terms into the search engine via the mobile device, and capture the multimedia content, (2) the geographic location of the user provided by the GPS coupled to the mobile device, (3) the data specifying characteristics of the environment in proximity to the user, and (4) the data specifying the bodily function of the user, the computer forecasting second contextual information that indicates future behavior of the user;
based on the forecasted second contextual information, the computer performing word sense disambiguation of the terms in the lexicon and adjusting the prioritization of the definitions of the terms in the lexicon;
based on the word sense disambiguation of the terms in the lexicon and the adjusted prioritization of the definitions of the terms, the computer modifying the candidate answers to the natural language question; and
based in part on the adjusted prioritization of the definitions of the terms in the lexicon, the modified candidate answers, and the forecasted second contextual information, the computer ranking the modified candidate answers to the natural language question, the highest ranked modified candidate answer being more likely to be a correct answer to the natural language question than the other candidate answers.

2. The method of claim 1, further comprising the computer adjusting weights of a machine learning ensemble based on the forecasted second contextual information, wherein the machine learning ensemble includes (1) logistic regression phases and routes, (2) dimensions of evidence refinement, (3) probability density functions, classification techniques, and regression techniques, (4) natural language processing systems, and (5) a data retrieval system.

3. The method of claim 1, wherein the step of generating the lexicon includes generating the lexicon based on textual information displayed by the mobile device to the user.

4. The method of claim 1, further comprising the step of the computer receiving the natural language question which is about a treatment for a medical condition of the user, the natural language question not including a country in which the user is located, wherein the step of identifying the first contextual information about the user includes identifying the current geographic location of the user provided by the GPS coupled to the mobile device, and wherein the step of ranking the modified candidate answers is based in part on the current geographic location of the user.

5. The method of claim 1, wherein the steps of determining the prioritization of the definitions of the terms based on the first contextual information, generating the lexicon of terms based on the first contextual information and the prioritization of the definitions, forecasting the second contextual information, performing word sense disambiguation, adjusting the prioritization of the definitions, modifying the candidate answers, and ranking the modified candidate answers are an enhancement to a question answering system that, without the enhancement, delivers answers to questions by receiving and parsing input text, looking for multiple candidate answers in a data set, and assigning confidence scores to respective candidate answers without taking into account a context of users who ask the questions.

6. The method of claim 1, further comprising providing at least one support service for at least one of creating, integrating, hosting, maintaining, and deploying computer-readable program code in the computer, the program code being executed by a processor of the computer to implement the steps of identifying the first contextual information, determining the prioritization of the definitions of the terms, generating the lexicon, forecasting the second contextual information, performing the word sense disambiguation of the terms in the lexicon, adjusting the prioritization of the definitions of the terms, modifying the candidate answers, and ranking the modified candidate answers.

7. A computer program product, comprising:
a computer-readable storage medium; and
a computer-readable program code stored in the computer-readable storage medium, the computer-readable program code containing instructions that are carried out by a central processing unit (CPU) of a computer system to implement a method of ranking candidate answers to a natural language question, the method comprising the steps of:
the computer system identifying first contextual information about a user of a mobile device, the first contextual information including (1) interests of the user based on historical usage of the mobile device by the user to run applications on the mobile device, visit websites via a browser provided by the mobile device, display textual articles on the mobile devices, enter terms into a search engine via the mobile device, and capture multimedia content, (2) a geographic location of the user provided by a global positioning system (GPS) coupled to the mobile device, (3) data specifying characteristics of an environment in proximity to the user, the characteristics of the environment being detected and measured by a first sensor coupled to the mobile device, and (4) data specifying a bodily function of the user, the bodily function being detected and measured by a second sensor coupled to the mobile device;

based on the first contextual information, the computer system determining a prioritization of definitions of terms;

based on the first contextual information and the prioritization of the definitions of the terms, the computer system generating a lexicon of the terms;

using a forecaster that employs mobile-based time series manipulation and pattern recognition and based on (1) the historical usage of the mobile device by the user to run the applications on the mobile device, visit the websites via the browser provided by the mobile device, display the textual articles on the mobile devices, enter the terms into the search engine via the mobile device, and capture the multimedia content, (2) the geographic location of the user provided by the GPS coupled to the mobile device, (3) the data specifying characteristics of the environment in proximity to the user, and (4) the data specifying the bodily function of the user, the computer system forecasting second contextual information that indicates future behavior of the user;

based on the forecasted second contextual information, the computer system performing word sense disambiguation of the terms in the lexicon and adjusting the prioritization of the definitions of the terms in the lexicon;

based on the word sense disambiguation of the terms in the lexicon and the adjusted prioritization of the definitions of the terms, the computer system modifying the candidate answers to the natural language question; and based in part on the adjusted prioritization of the definitions of the terms in the lexicon, the modified candidate answers, and the forecasted second contextual information, the computer system ranking the modified candidate answers to the natural language question, the highest ranked modified candidate answer being more likely to be a correct answer to the natural language question than the other candidate answers.

8. The computer program product of claim 7, wherein the method further comprises the computer system adjusting weights of a machine learning ensemble based on the forecasted second contextual information, wherein the machine learning ensemble includes (1) logistic regression phases and routes, (2) dimensions of evidence refinement, (3) probability density functions, classification techniques, and regression techniques, (4) natural language processing systems, and (5) a data retrieval system.

9. The computer program product of claim 7, wherein the step of generating the lexicon includes generating the lexicon based on textual information displayed by the mobile device to the user.

10. The computer program product of claim 7, wherein the method further comprises the step of the computer system receiving the natural language question which is about a treatment for a medical condition of the user, the natural language question not including a country in which the user is located, wherein the step of identifying the first contextual information about the user includes identifying the current geographic location of the user provided by the GPS coupled to the mobile device, and wherein the step of ranking the modified candidate answers is based in part on the current geographic location of the user.

11. The computer program product of claim 7, wherein the steps of determining the prioritization of the definitions of the terms based on the first contextual information, generating the lexicon of terms based on the first contextual information and the prioritization of the definitions, forecasting the second contextual information, performing word sense disambiguation, adjusting the prioritization of the definitions, modifying the candidate answers, and ranking the modified candidate answers are an enhancement to a question answering system that, without the enhancement, delivers answers to questions by receiving and parsing input text, looking for multiple candidate answers in a data set, and assigning confidence scores to respective candidate answers without taking into account a context of users who ask the questions.

12. A computer system comprising:
a central processing unit (CPU);
a memory coupled to the CPU; and
a computer readable storage device coupled to the CPU, the storage device containing instructions that are executed by the CPU via the memory to implement a method of ranking candidate answers to a natural language question, the method comprising the steps of:

the computer system identifying first contextual information about a user of a mobile device, the first contextual information including (1) interests of the user based on historical usage of the mobile device by the user to run applications on the mobile device, visit websites via a browser provided by the mobile device, display textual articles on the mobile devices, enter terms into a search engine via the mobile device, and capture multimedia content, (2) a geographic location of the user provided by a global positioning system (GPS) coupled to the mobile device, (3) data specifying characteristics of an environment in proximity to the user, the characteristics of the environment being detected and measured by a first sensor coupled to the mobile device, and (4) data specifying a bodily function of the user, the bodily function being detected and measured by a second sensor coupled to the mobile device;

based on the first contextual information, the computer system determining a prioritization of definitions of terms;

based on the first contextual information and the prioritization of the definitions of the terms, the computer system generating a lexicon of the terms;

using a forecaster that employs mobile-based time series manipulation and pattern recognition and based on (1) the historical usage of the mobile device by the user to run the applications on the mobile device, visit the websites via the browser provided by the mobile device, display the textual articles on the mobile devices, enter the terms into the search engine via the mobile device, and capture the multimedia content, (2) the geographic location of the user provided by the GPS coupled to the mobile device, (3) the data specifying characteristics of the environment in proximity to the user, and (4) the data specifying the bodily function of the user, the computer system forecasting second contextual information that indicates future behavior of the user;

based on the forecasted second contextual information, the computer system performing word sense disambiguation of the terms in the lexicon and adjusting the prioritization of the definitions of the terms in the lexicon;

based on the word sense disambiguation of the terms in the lexicon and the adjusted prioritization of the definitions of the terms, the computer system modifying the candidate answers to the natural language question;

based in part on the adjusted prioritization of the definitions of the terms in the lexicon, the modified candidate answers, and the forecasted second contextual information, the computer system ranking the modified candidate answers to the natural language question, the highest ranked modified candidate answer being more likely to be a correct answer to the natural language question than the other candidate answers.

13. The computer system of claim 12, wherein the method further comprises the computer system adjusting weights of a machine learning ensemble based on the forecasted second contextual information, wherein the machine learning ensemble includes (1) logistic regression phases and routes, (2) dimensions of evidence refinement, (3) probability density functions, classification techniques, and regression techniques, (4) natural language processing systems, and (5) a data retrieval system.

14. The computer system of claim 12, wherein the step of generating the lexicon includes generating the lexicon based on textual information displayed by the mobile device to the user.

15. The computer system of claim 12, wherein the method further comprises the step of the computer system receiving the natural language question which is about a treatment for a medical condition of the user, the natural language question not including a country in which the user is located, wherein the step of identifying the first contextual information about the user includes identifying the current geographic location of the user provided by the GPS coupled to the mobile device, and wherein the step of ranking the modified candidate answers is based in part on the current geographic location of the user.

16. The computer system of claim 12, wherein the steps of determining the prioritization of the definitions of the terms based on the first contextual information, generating the lexicon of terms based on the first contextual information and the prioritization of the definitions, forecasting the second contextual information, performing word sense disambiguation, adjusting the prioritization of the definitions, modifying the candidate answers, and ranking the modified candidate answers are an enhancement to a question answering system that, without the enhancement, delivers answers to questions by receiving and parsing input text, looking for multiple candidate answers in a data set, and assigning confidence scores to respective candidate answers without taking into account a context of users who ask the questions.

* * * * *